United States Patent
Chien et al.

(10) Patent No.: US 7,561,189 B2
(45) Date of Patent: Jul. 14, 2009

(54) METHOD AND APPARATUS OF IMAGE DYNAMIC RESPONSE RE-MAPPING AND DIGITAL CAMERA USING THE SAME

(75) Inventors: Chien-Chia Chien, Nan Tou County (TW); Kun-Wei Lin, Hsin Chu (TW); Li-Ming Chen, Chieh Lung (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 733 days.

(21) Appl. No.: 11/362,056

(22) Filed: Feb. 27, 2006

(65) Prior Publication Data

US 2006/0221201 A1   Oct. 5, 2006

(30) Foreign Application Priority Data

Mar. 15, 2005  (TW) ............................. 94107761 A (51) Int. Cl.
*H04N 5/228* (2006.01)
(52) U.S. Cl. .................................................. 348/222.1
(58) Field of Classification Search ................. None
See application file for complete search history.

(56) References Cited

U.S. PATENT DOCUMENTS

| | | | |
|---|---|---|---|
| 5,010,504 A * | 4/1991 | Lee et al. ............... | 382/275 |
| 6,256,424 B1 * | 7/2001 | Murakami ............... | 382/260 |
| 6,690,731 B1 * | 2/2004 | Gough et al. ........... | 375/240.18 |
| 6,807,316 B2 * | 10/2004 | Enomoto ................ | 382/264 |
| 2002/0135683 A1 * | 9/2002 | Tamama et al. ......... | 348/222 |
| 2003/0095197 A1 * | 5/2003 | Wheeler et al. ......... | 348/241 |
| 2003/0117513 A1 * | 6/2003 | Anderson .............. | 438/333.11 |
| 2004/0105016 A1 * | 6/2004 | Sasaki ................... | 348/222.1 |
| 2005/0094007 A1 * | 5/2005 | Nomura et al. .......... | 348/272 |

* cited by examiner

*Primary Examiner*—Nhan T Tran
*Assistant Examiner*—Amy Hsu
(74) *Attorney, Agent, or Firm*—Muncy, Geissler, Olds & Lowe, PLLC (57) ABSTRACT

A method and an apparatus of image dynamic response re-mapping and a digital camera using the same. The apparatus first transforms an original Bayer image data into new transformed image data on a new image coordinate system, and then performs dynamic response re-mapping for the new transformed image data to calculate a gain modulated value. Finally, the apparatus adjusts the original Bayer image data according to the gain modulated value and outputs adjusted Bayer image data with dynamic response re-mapping. Because the apparatus transforms the original Bayer image data into the new transformed image data on the new image coordinate system in advance, it can reduce the bad effect on performing the dynamic response re-mapping on a high-frequency color signal and also keep the color coherence in color processing.

14 Claims, 5 Drawing Sheets

METHOD AND APPARATUS OF IMAGE DYNAMIC RESPONSE RE-MAPPING AND DIGITAL CAMERA USING THE SAME

This application claims the benefit of the filing date of Taiwan Application Ser. No. 094107761, filed on Mar. 15, 2005, the content of which is incorporated herein by reference.

BACKGROUND OF THE INVENTION

1. Field of the Invention

The invention relates to an image processing apparatus and an image processing method, and more particularly to an apparatus and a method of performing dynamic response re-mapping on a Bayer image, and a digital camera using the same.

2. Description of the Related Art

An apparatus composed of a digital camera and other image processing apparatuses includes an image acquiring unit, an image processing unit, an image displaying unit and an image compressing unit. These units have different information amounts in processing with the same image source, and have image losses during the image processing procedure. Among these information losses, the gray-scale loss tends to eliminate the detail texture of the image. That is, the gray-scale loss tends to reduce the dynamic response range of the image processing apparatus. Especially, if the dynamic range of the gray-scale of the acquired image is very wide, for example, a flash is adopted or a back-lighted shot is performed, a detail brightness variation of the highlight or the shadow in the image generated at the last stage cannot be shown due to the insufficient information.

U.S. Pat. No. 6,256,424(which is named '424 patent) discloses an image filter circuit utilizing the hardware architecture including an IIR-type low-frequency filter for generating an unsharp image for the dynamic range compression. The drawback of the '424 patent is that each edge of the processed image may become a pseudo-edge and cause distortion when the dynamic range compression ratio is large. U.S. Pat. No. 6,807,316(which is named '316 patent) discloses an image processing method and an image processing apparatus using multiple low-frequency filters to generate an unsharp image for the dynamic range compression, and can thus eliminate the drawback of generating the pseudo-edge.

Figure 1:
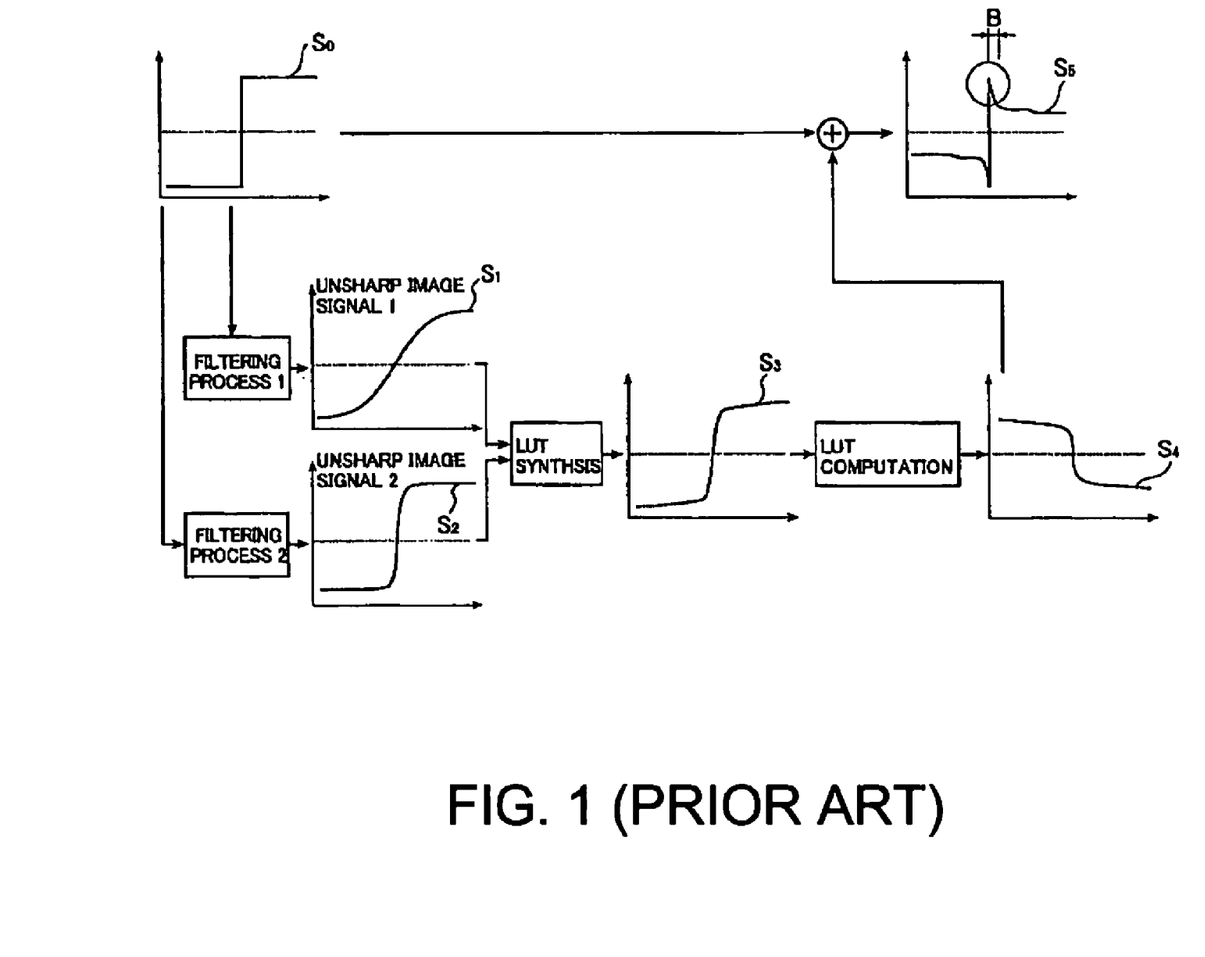
FIG. 1 shows the architecture of the image processing method and apparatus disclosed in U.S. Pat. No. 6,807,316.

FIG. 1 shows the architecture of the image processing method and apparatus of the '316 patent. As shown in FIG. 1, the image processing apparatus utilize a first filtering process (Filtering Process 1) and a second filtering process (Filtering Process 2) to convert an input signal into a first unsharp image signal (Unsharp Image signal 1) and a second unsharp image signal (Unsharp Image signal 2), respectively. Then, a look-up-table synthesis (LUT Synthesis) is performed to synthesize the first unsharp image signal and the second unsharp image signal into a single image signal. Thereafter, a look-up-table computation (LUT Computation) is performed to generate a compensation signal. Finally, the input signal and the compensation signal are summated to generate an output signal.

The above-mentioned technology mainly utilizes a low-pass filter to separate a low-frequency signal from a high-frequency signal of an original image, and then reduces a gain of the low-frequency signal to compress the dynamic response range in the low-frequency area of the original image. Finally, the compressed low-frequency signal and the low-frequency area of the original image are synthesized such that the high-frequency signal (i.e., the detail texture) of the original image may be kept and the dynamic response range is also compressed within the range of the information amount that can be provided by an image processing unit. This technology has the drawback that the frequency response of all images is continuous. If some frequency simply serves as a dividing point for separating the low-frequency signal from the high-frequency signal, the final image may have the unsharp phenomenon as stated in the '424 patent. Thus, multiple dividing points corresponding to several stages of bands have to be used, as mentioned in the '316 patent, in order to try to reduce the unsharp phenomenon. In addition, this technology has another drawback that it is emphasized in the processing of the low-frequency dynamic response, and does not process the gains of the high-frequency signal in different highlight areas. Although this method can properly reduce the contrast ratio of the image with the high contrast ratio, it cannot provide a suitable gain for the high-frequency components of the image in the dark state and the highlight area. Thus, the final image becomes smooth but lacks the image fidelity.

Figure 2:
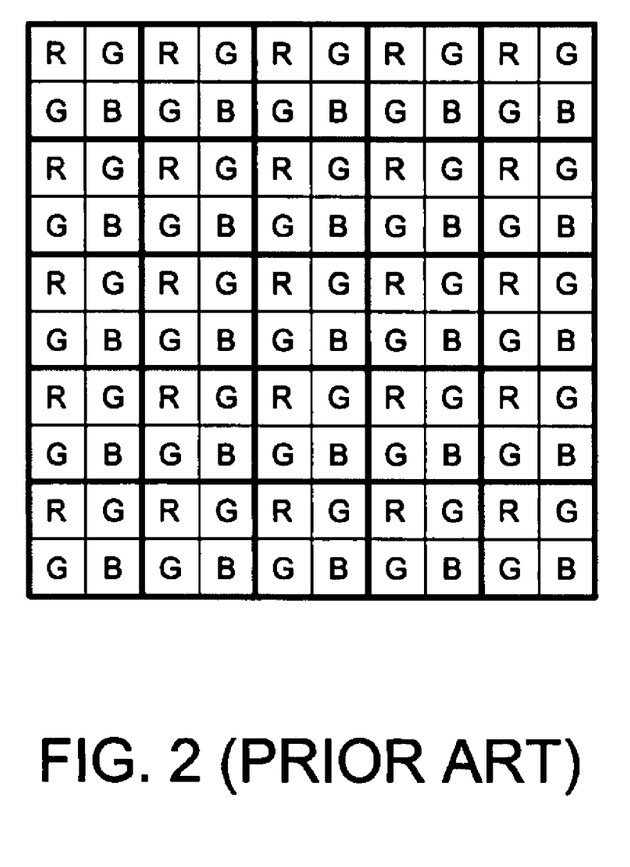
FIG. 2 shows a schematic illustration of a typical Bayer image.

Furthermore, the digital camera and other image capturing systems mainly include an image sensor, an image reproducing unit, an image display unit and an image compressing unit, etc. The image sensor can convert the brightness and the chroma of the natural image into digital messages. Thereafter, these digital messages are transformed into a digital image through the image reproducing, display and compressing units. The information structure generated in the image sensor of the current digital camera mainly corresponds to the Bayer image. Each pixel in the Bayer image only can sense one of three primary colors (R, G, B), as shown in FIG. 2. Thus, the image reproducing unit is needed to reproduce the other two color components and correct the colors such that the chroma of the natural image can be reproduced. Because the brightness range of the natural image is very wide, the digital camera system has to enlarge the response range of the image sensor on the three primary colors in order to capture more natural image messages. That is, the gray-scale degree of the sensor has to be increased. When the gray-scale degree of the image sensor is increased, the computation amount of the subsequent image processing unit is also increased. On the other hand, because the standard image compression format (e.g., JPEG) and the gray-scale degree of the display are restricted, the response range of the original sensor cannot be presented and the information is thus lost. More particularly, when the digital camera uses a flash or a back-lighted shot, the detailed brightness variation in the high light region or the shadow region of the final image cannot be presented due to the insufficient information. Thus, the dynamic response range of the system cannot be enhanced.

SUMMARY OF THE INVENTION

It is therefore an object of the invention to provide a method and a mechanism of performing dynamic response re-mapping on a Bayer image such that image data captured by an image sensor is free from being lost in the subsequent processing of an image processing unit.

The invention achieves the above-identified object by providing an apparatus of image dynamic response re-mapping for receiving original Bayer image data and performing the image dynamic response re-mapping on the original Bayer image data to generate modulated Bayer image data. The apparatus includes a color coordinate transforming unit, a high gain generator, a low gain generator, an image characteristic value generator, a weighting calculating unit, a gain modulated value calculating unit and an image synthesizing unit. The color coordinate transforming unit receives the original Bayer image data and transforms the original Bayer image data into new image data on a new image coordinate system. An image data quantity of the new image data on the new image coordinate system is smaller than a data quantity of the original Bayer image data. The high gain generator receives the new image data on the new image coordinate system and calculates a maximum gain of a high gain dynamic response distribution curve according to data of a to-be-processed pixel. The low gain generator receives the new image data on the new image coordinate system and calculates a minimum gain of a low gain dynamic response distribution curve according to the data of the to-be-processed pixel. The image characteristic value generator receives the new image data on the new image coordinate system, performs an image locality analysis on an neighboring image of the to-be-processed pixel on the new image coordinate system, and calculates a characteristic value of the neighboring image, which comprises an average illumination $\Delta y$, a illumination variability $\delta y$ and a histogram of illumination. The weighting calculating unit generates a first weighting, which is inversely proportional to the average illumination $\Delta y$, and a second weighting, which is directly proportional to the illumination variability $\delta y$ and relates to the histogram and the data of the to-be-processed pixel, according to the characteristic value. The gain modulated value calculating unit calculates a gain modulated value according the maximum gain, the minimum gain, the first weighting and the second weighting. The image synthesizing unit receives the original Bayer image data and the gain modulated value, and multiplies the original Bayer image data by the corresponding gain modulated value to generate the modulated Bayer image data.

DETAILED DESCRIPTION OF THE INVENTION

The apparatus and method of image dynamic response re-mapping (modulation) and the digital camera using the same according to the invention will be described with reference to the accompanying drawings.

The method of the invention of performing the dynamic response re-mapping on a Bayer image is to transform a first Bayer image into a new transformed image on a new image coordinate system, and then to calculate a gain modulated value according to the new transformed image. Finally, the original Bayer image is adjusted according to the gain modulated value. The invention transforms the Bayer image into the new transformed image on the new image coordinate system for the purpose of reducing the bad effect caused by the high-frequency color signal of the Bayer image on the subsequent dynamic response re-mapping, and of keeping the color coherence in the color processing.

Figure 3:
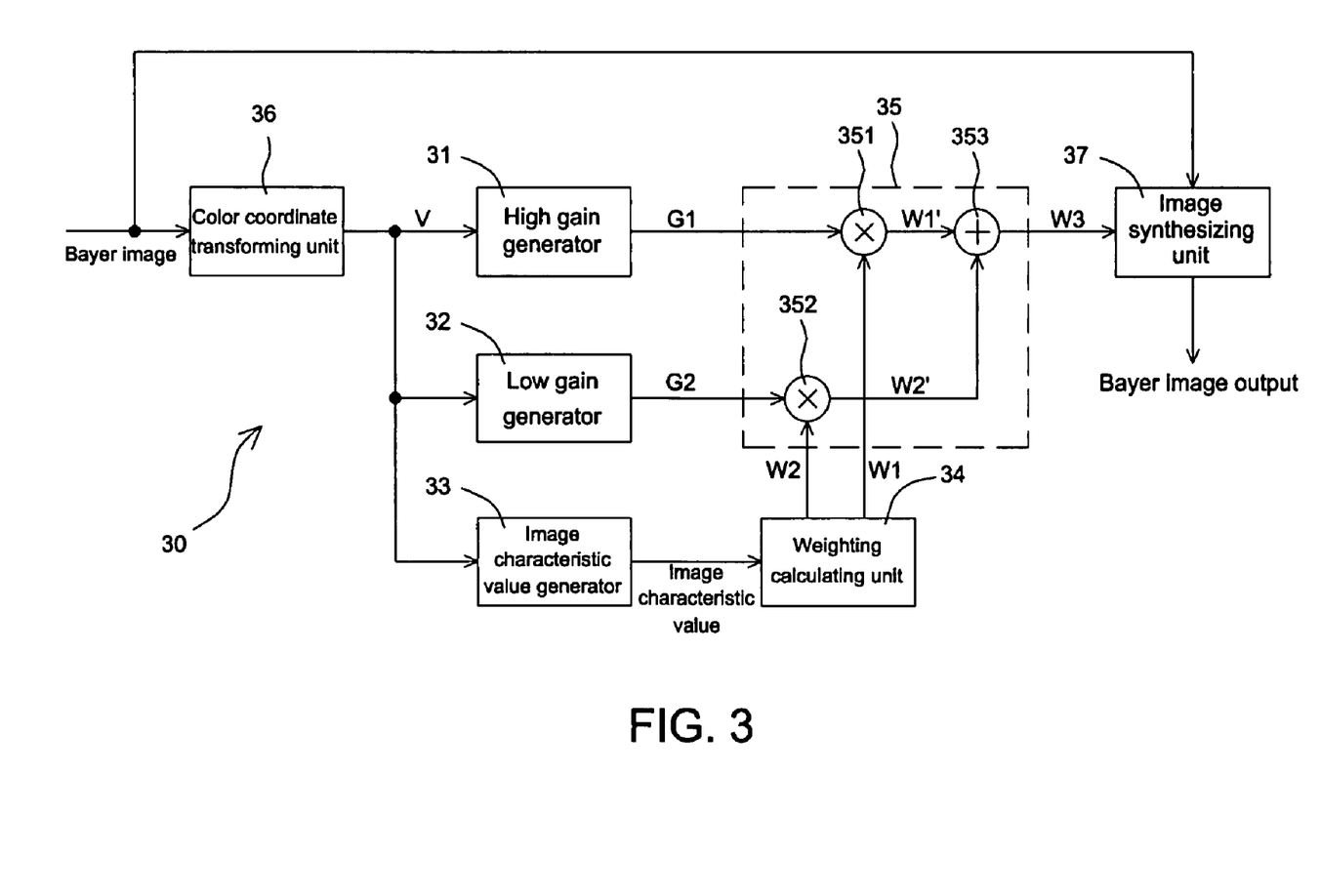
FIG. 3 shows the architecture of an apparatus of image dynamic response re-mapping according to the invention.

FIG. 3 shows the architecture of an apparatus 30 of image dynamic response re-mapping according to the invention.

Referring to FIG. 3, the apparatus 30 includes a color coordinate transforming unit 36, a high gain generator 31, a low gain generator 32, an image characteristic value generator 33, a weighting calculating unit 34, a gain modulated value calculating unit 35 and an image synthesizing unit 37. The gain modulated value calculating unit 35 includes two multipliers 351 and 352 and one adder 353.

The color coordinate transforming unit 36 receives an original Bayer image data and transforms it into a new transformed image data on a new image coordinate system. For example, every 2*2 pixel matrix in the original Bayer image data is transformed into a single pixel on the new image coordinate system by taking a maximum in every 2*2 pixel matrix as the pixel value on the new image coordinate system, or by taking an average in every 2*2 pixel matrix as the pixel value on the new image coordinate system. Thus, the data quantity on the new image coordinate system is only one-fourth that on the Bayer image system.

The high gain generator 31 and the low gain generator 32 receive the new transformed image data V, and respectively generate a maximum gain G1 and a minimum gain G2 from the calculation of the high gain dynamic response distribution curve and low gain dynamic response distribution curve according to the pixel value of a to-be-processed pixel. In general, the high gain generator 31 and the low gain generator 32 correspond to the so-called $\gamma$ curve adjustment. Because the $\gamma$ curve adjustment is well know in the art, detailed descriptions thereof will be omitted. The parameters for the $\gamma$ curve adjustment may be set according to the user's preference. For example, the high gain generator 31 and the low gain generator 32 may generate the maximum and minimum gains G1 and G2 by way of look-up-table.

The image characteristic value generator 33 generates an image characteristic value according to the new transformed image data V. That is, the image characteristic value generator 33 performs an image locality analysis on a neighboring image of the to-be-processed pixel on the new image coordinate system. The image characteristic of the image signal in this region is analyzed and then the characteristic value of the neighboring image is calculated. The image characteristic value includes an average illumination $\Delta y$, an illumination variability $\delta y$, and a histogram of illumination. The method of calculating the average illumination $\Delta y$, the illumination variability $\delta y$ and the histogram of the image is well known in the art, and detailed descriptions thereof will be omitted. The so-called local image denotes the pixels neighboring the to-be-processed pixel, such as the image pixels in the 5*5 pixel matrix around the to-be-processed pixel.

The weighting calculating unit 34 generates weightings W1 and W2 corresponding to the gains G1 and G2. The weighting calculating unit 34 calculates the weightings W1 and W2 according to the image characteristic value according to Equations (1) and (2).

$$W1 = c1*(2^d - \Delta y) + c2(\delta y) \tag{1},$$

wherein c1 and c2 are constants, $2^d$ denotes the maximum gray-scale number of the image, $\Delta y$ denotes the average illumination and $\delta y$ denotes the illumination variability. In this embodiment, c1=1 and c2=16. When the image has the gray-scale number of 256, d=8.

$$W2 = c3*\text{position}(y \text{ at histogram}) \tag{2},$$

wherein c3 is a constant and c3=16 in this embodiment, and the position(y at histogram) denotes the position of y in the histogram of illumination.

The multiplier 351 multiplies the gain G1 by the weighting W1 to generate a weighting gain W1'. The multiplier 352 multiplies the gain G2 by the weighting W2 to generate a weighting gain W2'. Finally, the adder 353 adds the weighting gain W1' and the weighting gain W2' together to generate a gain modulated value W3.

The image synthesizing unit 37 receives the original Bayer image data and the corresponding gain modulated value W3, and generates a modulated Bayer image. The image synthesizing unit 37 multiples the pixel value of the original Bayer image by the corresponding gain modulated value W3. That is, the pixels of the original Bayer image in every 2*2 pixel matrix correspond to one gain modulated value W3.

So, the apparatus of the invention transforms the Bayer image data into the new image coordinate system so as to reduce the bad effect of the high-frequency color signal of the Bayer image on the subsequent dynamic response re-mapping, and also to keep the color coherence in the color processing.

Figure 4:
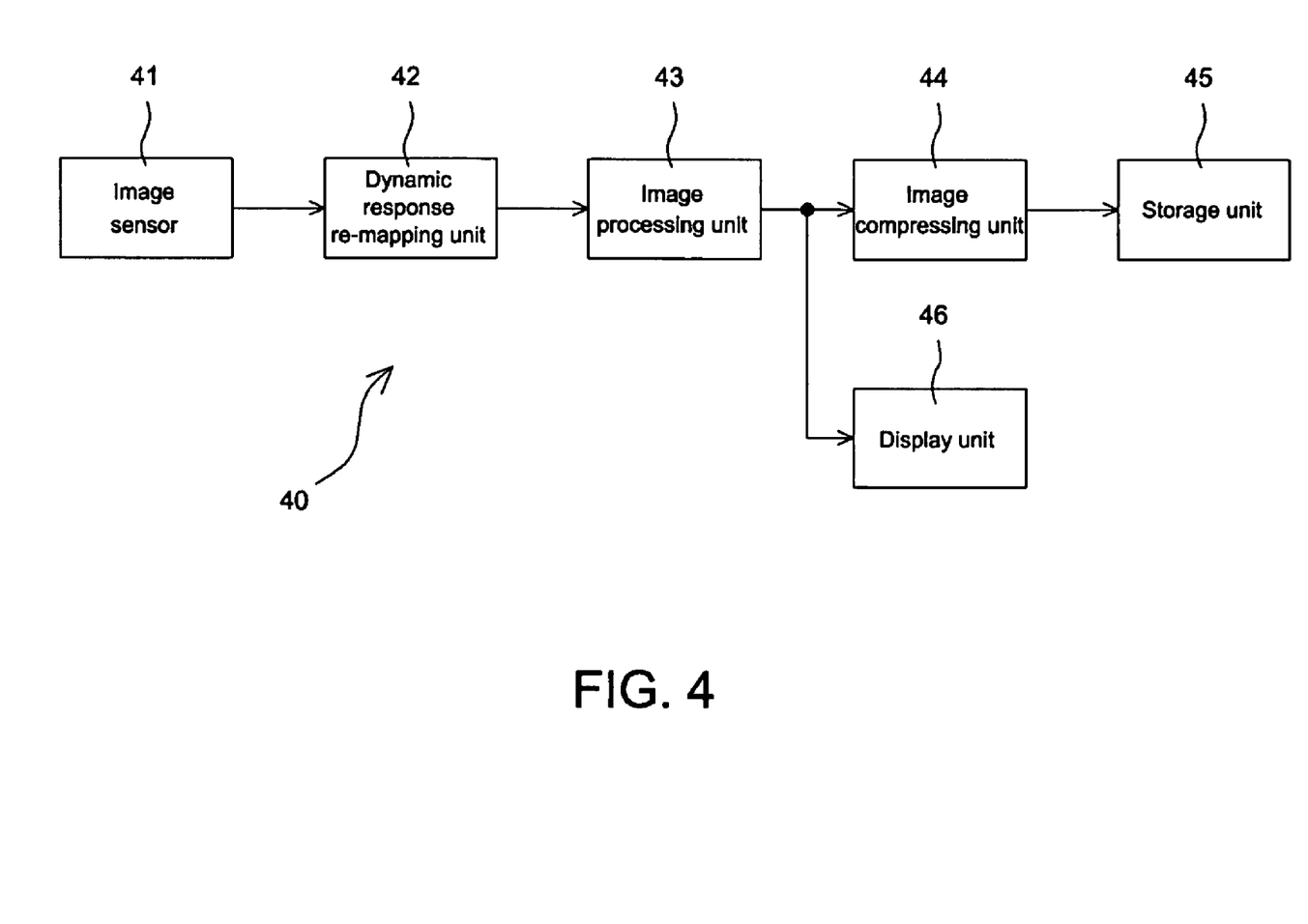
FIG. 4 is a block diagram showing an image processing system of a digital camera using the apparatus of image dynamic response re-mapping of the invention.

FIG. 4 is a block diagram showing an image processing system 40 of a digital camera using the apparatus of image dynamic response re-mapping of the invention. Referring to FIG. 4, the image processing system 40 of the digital camera includes an image sensor 41, a dynamic response re-mapping unit 42, an image processing unit 43, an image compressing unit 44, a storage unit 45 and a display unit 46.

The image sensor 41 captures a to-be-shot image and then transforms it into digital data of a Bayer image. The image dynamic response re-mapping unit 42 receives the Bayer image data and modulates the dynamic response of the Bayer image data to generate a modulated Bayer image data. The image processing unit 43 receives the modulated Bayer image data and performs image processing, such as image reproducing, white balancing, color interpolation, color correction, and RGB-to-YUV transformation, on the image data. The image processing is well known in the art, and detailed descriptions thereof will be omitted. The image compressing unit 44 receives the image processed by the image processing unit 43, compresses the image and then stores the compressed image to the storage unit 45. The display unit 46 receives and displays the image processed by the image processing unit 43. Thus, the digital camera using the image processing apparatus of the invention can enhance the detail brightness variation of the high light region or the shadow region through the function of the image dynamic modulation when a flash or a back-lighted shot is utilized.

Figure 5:
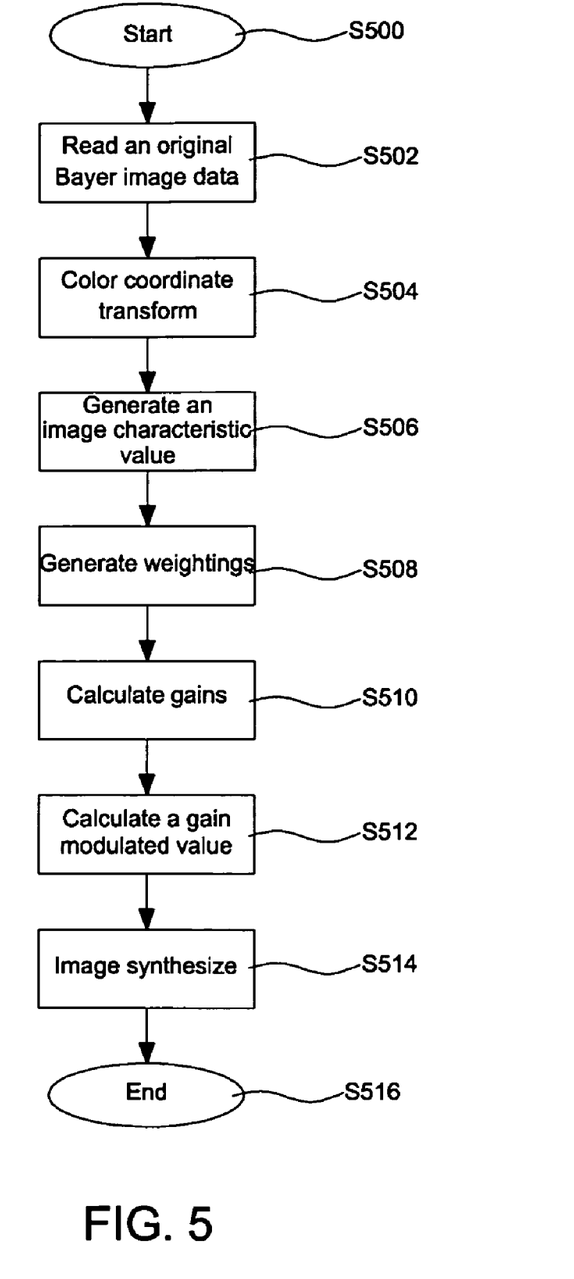
FIG. 5 shows the flow chart of a method of image dynamic response re-mapping of the invention.

FIG. 5 is a flow chart showing a method of image dynamic response re-mapping of the invention. As shown in FIG. 5, the method of image dynamic response re-mapping includes the following steps.

Step S500: start.

Step S502: read an original Bayer image data.

Step S504: transform color coordinate. The system transforms the original Bayer image data into new transformed image data on a new image coordinate system. For example, every 2*2 pixel matrix in the original Bayer image data is transformed into a single pixel on the new image coordinate system. The transforming method is to take a maximum from each 2*2 pixel matrix as a pixel value on the new image coordinate system. Of course, the transform method may also take the average. So, the data quantity on the new image coordinate system is only one-fourth that on the Bayer image system.

Step S506: generate a characteristic value of a local image. The system performs an image locality analysis on neighboring images of the to-be-processed pixel on the new image coordinate system. An image characteristic analyzing unit calculates the characteristic value of the neighboring image according to the image signal of this region. The characteristic value includes an average illumination $\Delta y$, an illumination variability $\delta y$ and a histogram of illumination.

Step S508: generate two weightings W1 and W2. The system determines two weightings of the high and low gain dynamic response distribution curves for the pixel according to the characteristic value of the local image. The high gain curve can increase the image brightness and may be used, for example, to enhance the brightness of the dark state region. The low gain curve reduces the image brightness and may be used, for example, to increase the contrast ratio of the image. In this embodiment of the invention, the weighting of the high gain curve is inversely proportional to the average illumination $\Delta y$ calculated by the characteristic analyzing unit, and directly proportional to the illumination variability $\delta y$. That is, as the brightness variation in the dark state region of the image gets larger, the weighting of the high gain curve increases, and the weighting of the low gain curve relates to the histogram, which is calculated by the characteristic analyzing unit, and the brightness of the pixel. If the brightness of the pixel falls within the dark state region of the histogram, the weighting of the low gain curve increases.

First Weighting:

$$W1 = c1*(2^d - \Delta y) + c2(\delta y) \quad (1)$$

wherein c1 and c2 are constants, $2^d$ denotes the maximum gray-scale number of the image, $\Delta y$ denotes the average illumination, and $\delta y$ denotes the illumination variability. In this embodiment, c1=1 and c2=16. When the image has the gray-scale number of 256, d=8.

Second Weighting:

$$W2 = c3*\text{position}(y \text{ at histogram}) \quad (2)$$

wherein c3 is a constant and c3=16 in this embodiment, and position(y at histogram) denotes the position of y in the histogram.

Step S510: generate gains. The system calculates a maximum gain G1 and a minimum gain G2 of the high and low gain dynamic response distribution curves according to the data of the to-be-processed pixel on the new image coordinate system.

Step S512: calculate a gain modulated value. The system multiplies the two weightings W1 and W2 by the maximum and minimum gains G1 and G2, respectively, to obtain W1' and W2', and then adds W1' and W2' together to generate the gain modulated value W3.

$$W1' = G1*W1 \quad (3)$$

$$W2' = G2*W2 \quad (4)$$

$$W3 = W1' + W2' \quad (5)$$

Step S514: perform the image synthesis. The system performs the image synthesis by multiplying the original Bayer image data by the corresponding gain modulated value W3 and then outputting the product as adjusted Bayer image data. In the color coordinate transforming step, the 2*2 pixel matrix data in the original Bayer image is transformed into single color data. So, the 2*2 pixel matrix data of the original Bayer image is multiplied by the corresponding gain modulated value W3 in the image synthesis.

Step S516: end.

Thus, the invention can avoid the unsharp drawback caused in the prior art when the band gap separating point is used. Meanwhile, the invention also provides a method of changing the gain for the high-frequency signal of the image in different bright state regions. The invention enhances the detail texture variation of the image by changing the dynamic response distribution of the image so as to reduce the reduction of the dynamic response range of the system, which is caused by the information loss during the image processing procedure. In addition, the image fidelity can be enhanced due to the dynamic response re-mapping of the image.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An apparatus of image dynamic response re-mapping for receiving an original Bayer image data and performing the image dynamic response re-mapping on the original Bayer image data to generate a modulated Bayer image data, the apparatus comprising:
   a color coordinate transforming unit for receiving the original Bayer image data and transforming the original Bayer image data into a new transformed image data on a new image coordinate system, the image data quantity of the new transformed image data on the new image coordinate system being smaller than the data quantity of the original Bayer image data;
   a high gain generator for receiving the new transformed image data and calculating a maximum gain from a high gain dynamic response distribution curve according to data of a to-be-processed pixel;
   a low gain generator for receiving the new transformed image data and calculating a minimum gain from a low gain dynamic response distribution curve according to the data of the to-be-processed pixel;
   an image characteristic value generator for receiving the new transformed image data, performing an image locality analysis on an neighboring image of the to-be-processed pixel on the new image coordinate system, and calculating a characteristic value of the neighboring image, which comprises an average illumination $\Delta y$, a illumination variability $\delta y$ and a histogram of illumination;
   a weighting calculating unit for generating a first weighting and a second weighting according to the characteristic value, wherein the first weighting is inversely proportional to the average illumination $\Delta y$, and the second weighting is directly proportional to the illumination variability $\delta y$ and relates to the histogram of illumination and the data of the to-be-processed pixel;
   a gain modulated value calculating unit for calculating a gain modulated value according the maximum gain, the minimum gain, the first weighting and the second weighting; and
   an image synthesizing unit for receiving the original Bayer image data and the gain modulated value, and multiplying the original Bayer image data by the corresponding gain modulated value to generate the modulated Bayer image data.

2. The apparatus according to claim 1, wherein the color coordinate transforming unit extracts a maximum from each 2×2 pixel matrix of the original Bayer image data as a single pixel of the new transformed image data.

3. The apparatus according to claim 1, wherein the high gain generator performs a γ curve adjusting and generates the maximum gain by a table look-up method.

4. The apparatus according to claim 1, wherein the low gain generator performs a γ curve adjusting and generates the minimum gain by a table look-up method.

5. The apparatus according to claim 1, wherein the weighting calculating unit generates the first weighting according to the equation:

$$W1=c1*(2^d-\Delta y)+c2(\delta y),$$

wherein W1 denotes the first weighting, c1 and c2 are constants, $2^d$ denotes a maximum gray-scale number of the image, $\Delta y$ denotes the average illumination, and $\delta y$ denotes the illumination variability.

6. The apparatus according to claim 1, wherein the weighting calculating unit generates the second weighting according to the following equation:

$$W2=c3*\text{position}(y \text{ at histogram}),$$

wherein W2 denotes the second weighting, c3 is a constant, and position(y at histogram) denotes a position of "y" on the histogram.

7. A method of image dynamic response re-mapping for receiving an original Bayer image data and performing the image dynamic response re-mapping on the original Bayer image data to generate modulated Bayer image data, the method comprising:
   a color coordinate transforming step for receiving the original Bayer image data by a color coordinate transforming unit and transforming the original Bayer image data into a new transformed image data on a new image coordinate system, wherein the quantity of the new transformed image data on the new image coordinate system is smaller than the data quantity of the original Bayer image data;
   a high gain generating step for receiving the new transformed image data by a high gain generator and calculating a maximum gain from a high gain dynamic response distribution curve according to data of a to-be-processed pixel;
   a low gain generating step for receiving the new transformed image data by a low gain generator and calculating a minimum gain from a low gain dynamic response distribution curve according to the data of the to-be-processed pixel;
   an image characteristic value generating step for receiving the new transformed image data by an image characteristic value generator, performing an image locality analysis on a neighboring image of the to-be-processed pixel on the new image coordinate system, and calculating a characteristic value of the neighboring image, which comprises an average illumination $\Delta y$, a illumination variability $\delta y$ and a histogram of illumination;
   a weighting calculating step for generating by a weighting calculating unit a first weighting, which is inversely proportional to the average illumination $\Delta y$, and a second weighting, which is directly proportional to the illumination variability $\delta y$ and relates to the histogram and the data of the to-be- processed pixel, according to the characteristic value;
   a modulated value calculating step for calculating a gain modulated value by a gain modulated value calculating unit according to the maximum gain, the minimum gain, the first weighting and the second weighting; and
   an image synthesizing step for receiving the original Bayer image data and the gain modulated value by an image synthesizing unit, and multiplying the original Bayer image data by the corresponding gain modulated value to generate the modulated Bayer image data.

8. The method according to claim 7, wherein the color coordinate transforming step extracts a maximum from each 2×2 pixel matrix of the original Bayer image data as a single pixel of the new transformed image data.

9. The method according to claim 7, wherein the high gain generating step performs a γ curve adjusting and generates the maximum gain by a table look-up method.

10. The method according to claim 7, wherein the low gain generating step performs a γ curve adjusting and generates the minimum gain by a table look-up method.

11. The method according to claim 7, wherein the weighting calculating step generates the first weighting according to the equation:

$$W1=c1*(2^d-\Delta y)+c2(\delta y),$$

wherein W1 denotes the first weighting, c1 and c2 are constants, $2^d$ denotes a maximum gray-scale number of the image, $\Delta y$ denotes the average illumination, and $\delta y$ denotes the illumination variability.

12. The method according to claim 7, wherein the weighting calculating step generates the second weighting according to the following equation:

$$W2=c3*\text{position}(y \text{ at histogram}),$$

wherein W2 denotes the second weighting, c3 is a constant, and position(y at histogram) denotes a position of "y" on the histogram.

13. A digital camera with an image dynamic response re-mapping function, the digital camera comprising:

an image sensor for capturing a to-be-shot image and then transforming the to-be-shot image into an original Bayer image data;

an image dynamic response re-mapping unit for receiving the original Bayer image data and modulating dynamic response of the original Bayer image data to generate modulated Bayer image data;

an image processing unit for receiving the modulated Bayer image data and processing the modulated Bayer image data into processed image data;

an image compressing unit for receiving the processed image data and compressing the processed image data into compressed image data;

a storage unit for receiving and storing the compressed image data; and a display unit for receiving and displaying the processed image data, wherein the image dynamic response re-mapping unit comprises:

a color coordinate transforming unit for receiving the original Bayer image data and transforming the original Bayer image data into new transformed image data on a new image coordinate system, the image data quantity of the new transformed image data on the new image coordinate system being smaller than the data quantity of the original Bayer image data;

a high gain generator for receiving the new transformed image data and calculating a maximum gain from a high gain dynamic response distribution curve according to data of a to-be-processed pixel;

a low gain generator for receiving the new transformed image data and calculating a minimum gain from a low gain dynamic response distribution curve according to the data of the to-be-processed pixel;

an image characteristic value generator for receiving the new transformed image data, performing an image locality analysis on an neighboring image of the to-be-processed pixel on the new image coordinate system, and calculating a characteristic value of the neighboring image, which comprising an average illumination $\Delta y$, a illumination variability $\delta y$ and a histogram;

a weighting calculating unit for generating a first weighting and a second weighting according to the characteristic value, wherein the first weighting is inversely proportional to the average illumination $\Delta y$, and the second weighting, which is directly proportional to the illumination variability $\delta y$ and relates to the histogram and the data of the to-be-processed pixel;

a calculating unit for calculating a gain modulated value according the maximum gain, the minimum gain, the first weighting and the second weighting; and an image synthesizing unit for receiving the original Bayer image data and the gain modulated value, and multiplying the original Bayer image data by the corresponding gain modulated value to generate the modulated Bayer image data.

14. The digital camera according to claim 13, wherein the image processing unit performs image reproducing, white balancing, color interpolating, color correcting, RGB-to-YUV transforming on the modulated Bayer image data.

* * * * *